US007260639B2

(12) United States Patent
Afergan et al.

(10) Patent No.: US 7,260,639 B2
(45) Date of Patent: Aug. 21, 2007

(54) METHOD AND SYSTEM FOR PROTECTING WEB SITES FROM PUBLIC INTERNET THREATS

(75) Inventors: Michael M. Afergan, Cambridge, MA (US); Andrew B. Ellis, Medford, MA (US); Ravi Sundaram, Cambridge, MA (US); Hariharan S. Rahul, Cambridge, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 601 days.

(21) Appl. No.: 10/191,309

(22) Filed: Jul. 9, 2002

(65) Prior Publication Data

US 2004/0010601 A1 Jan. 15, 2004

(51) Int. Cl.
*G06F 15/16* (2006.01)
(52) U.S. Cl. .................. 709/229; 709/214; 709/218; 709/219; 709/224; 709/228; 726/12; 726/22
(58) Field of Classification Search ............... 709/229; 705/51
See application file for complete search history.

(56) References Cited

U.S. PATENT DOCUMENTS

| 5,918,018 | A | 6/1999 | Gooderum et al. | |
|---|---|---|---|---|
| 6,173,311 | B1* | 1/2001 | Hassett et al. | 709/202 |
| 6,925,495 | B2* | 8/2005 | Hegde et al. | 709/223 |
| 6,952,737 | B1* | 10/2005 | Coates et al. | 709/229 |
| 6,993,476 | B1* | 1/2006 | Dutta et al. | 704/9 |

| 2002/0035698 | A1 | 3/2002 | Malan et al. | |
|---|---|---|---|---|
| 2002/0138437 | A1* | 9/2002 | Lewin et al. | 705/51 |

OTHER PUBLICATIONS

Mark Nottingham, "On Defining a Role for Demand-Driven Surrogate Origin Servers," Feb. 2001, Computer Communication, vol. 24, pp. 215-221.*
IT Audit, vol. 4, Feb. 15, 2001 at http://www.theiia.org/itaudit/index.cfm?fuseraction=forum%fid=227.*
"CERT Advisory CA-1995-01 IP Spoofing Attacks and Hijacked Terminal Connections," Sep. 23, 1997, at http://www.cert.org/advisories/CA-1995-01.html.*

* cited by examiner

*Primary Examiner*—Yves Dalencourt
(74) *Attorney, Agent, or Firm*—David H. Judson

(57) ABSTRACT

The present invention addresses the known vulnerabilities of Web site infrastructure by making an origin server substantially inaccessible via Internet Protocol traffic. In particular, according to a preferred embodiment, the origin server is "shielded" from the publicly-routable IP address space. Preferably, only given machines (acting as clients) can access the origin server, and then only under restricted, secure circumstances. In a preferred embodiment, these clients are the servers located in a "parent" region of a content delivery network (CDN) tiered distribution hierarchy. The invention implements an origin server shield that protects a site against security breaches and the high cost of Web site downtime by ensuring that the only traffic sent to an enterprise's origin infrastructure preferably originates from CDN servers. The inventive "shielding" technique protects a site's Web servers (as well as backend infrastructure, such as application servers, databases, and mail servers) from unauthorized intrusion—improving site uptime and in the process, customer loyalty.

6 Claims, 5 Drawing Sheets

METHOD AND SYSTEM FOR PROTECTING WEB SITES FROM PUBLIC INTERNET THREATS

BACKGROUND OF THE INVENTION

1. Technical Field

The present invention relates generally to techniques for cloaking a Web site origin server from the public Internet while still ensuring that content otherwise available from the site is delivered quickly and without fail, regardless of a user location.

2. Description of the Related Art

Today's Web sites are a double-edged sword. They present enterprises with the opportunity for both resounding success and costly, dramatic failure. The possibility for either scenario to occur is chiefly due to the Internet's open design. Indeed, the ability to reach a global community of customers and partners via the Web comes with serious security risks. The open design means that enterprises must expose themselves by opening a public entry-point to get the global reach they need. Couple that with the inherent weaknesses of centralized infrastructure and there is a recipe for failure. Indeed, a growing number of threats can bring a site down daily. These threats include hacker attacks, viruses, Internet worms, content tampering and constant Denial of Service (DoS) attacks. DoS attacks are well known but few realize how rapidly they evolve, as witnessed by self-propagating worms, use of Internet Relay Chat (IRC) technology, attacks against routers and other techniques. The University of California at San Diego's Cooperative Association for Internet Data Analysis (CAIDA) estimates that over 4,000 Web sites are attacked in this way every week.

Any one of these threats can produce unpredictable site disruptions that impede revenue operations, dilute brand investments, hamper productivity and reduce goodwill and reputation. In the past, an enterprise's only defense was to maintain vigilant and expensive system upgrades to current with constantly evolving assaults, as it has been considered impossible to eliminate public entry points into a site's Web servers.

Enterprise firewalls do not adequately address the problem. While firewalls attempt to discard malicious packets, they are not a complete protection as they themselves are on the public Internet and are susceptible to DoS attacks. When a firewall filters packets, CPU resources are consumed by seemingly authentic requests. At best, a firewall can limit exposure, but some portion of the site's infrastructure is still publicly available and susceptible to attack It would be highly desirable to provide an additional layer of protection to ensure business continuity of an enterprise Web site.

BRIEF SUMMARY OF THE INVENTION

It is a primary object of the present invention for "cloaking" a Web site from the public Internet while still ensuring that content is delivered quickly and without fail, regardless of user location. The inventive technique substantially eliminates the public entry points found on Web servers today while delivering end users of a protected site unparalleled performance and reliability.

A more specific object of the invention is to provide an origin server "shield" to render the server substantially inaccessible at a publicly-routable Internet Protocol (IP) address. In an illustrative embodiment, an origin server shield according to the present invention is a collection of strategically-positioned content delivery network (CDN) server regions designed to complement an existing infrastructure protecting an origin site. A CDN server region may include one or more content servers. Preferably, the origin server shield resides at or near a data center at which the origin server is located, and that data center may be at a company's premises, a dedicated facility, or a co-location facility.

According to an illustrative embodiment, the technical advantages of the present invention are achieved by deploying an origin server shield in the same data center as the origin Web server, typically behind upstream routers that provide Internet connectivity but in front of a firewall. This placement allows the shield to serve both as an external buffer for the origin site as well as the trusted party eligible to access the origin site. In this fashion, one or more dedicated content delivery network (CDN) server regions that comprise the shield handle communications with the "public" and connect to the origin server only when needed, preferably via a private connection. As a consequence, the shield protects the origin by effectively removing it from accessible Internet Protocol (IP) space.

In a given illustrative configuration, an origin server uses a content delivery network to serve given site content, and an origin server "shield" is established for the origin. The shield comprises at least one CDN "shield" region upstream of an enterprise firewall and access router but downstream of the router connecting the origin server to the rest of the data center of the Internet. The "shield" region also preferably serves as a "parent" region to the CDN edge servers. To provide maximum protection, two access controls are preferably implemented. First, an IP access control list (ACL) or equivalent access control is set downstream of the shield region so that the only IP traffic that can access the origin site is traffic originating from servers in the shield region. In an illustrative embodiment, this is accomplished by setting an access control list (ACL) on the enterprise firewall to restrict access to the origin server except, e.g., from IP addresses of the CDN servers in the shield region(s). In addition, the router upstream of the shield (e.g., the router connecting to the Internet) is provisioned to implement IP spoof blocking upstream of the shield region to ensure that only the shield region is able to pass through the downstream ACL.

Such access controls (e.g., upstream ACLs and router configurations) prevent any other machine on the Internet from spoofing the shield region server IP addresses in an attempt to masquerade as the shield server. As a result, no other machine on the Internet has the ability to communicate directly with the origin server. At the same time, however, the CDN's other distributed edge servers continue to have complete access to the current content as long as that content is accessible via the CDN. This is because the shield region(s) are configured to serve as a "parent" region for the edge servers. If a CDN edge server ever needs content that it cannot find at one of its peers, it will direct that request at one of the shield regions. As a result, bona fide end-users will always be able to retrieve content from edge servers with maximal performance and reliability while the origin remains protected.

The foregoing has outlined some of the more pertinent features of the present invention. These features should be construed to be merely illustrative. Many other beneficial results can be attained by applying the disclosed invention in a different manner or by modifying the invention as will be described.

DETAILED DESCRIPTION OF THE PREFERRED EMBODIMENT

By way of background, it is known in the prior art to deliver digital content (e.g., HTTP content, streaming media and applications) using an Internet content delivery network (CDN). A CDN is a network of geographically-distributed content delivery nodes that are arranged for efficient delivery of content on behalf of third party content providers. Typically, a CDN is implemented as a combination of a content delivery infrastructure, a request-routing mechanism, and a distribution infrastructure. The content delivery infrastructure usually comprises a set of "surrogate" origin servers that are located at strategic locations (e.g., Internet network access points, Internet Points of Presence, and the like) for delivering content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently-accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system.

Figure 1:
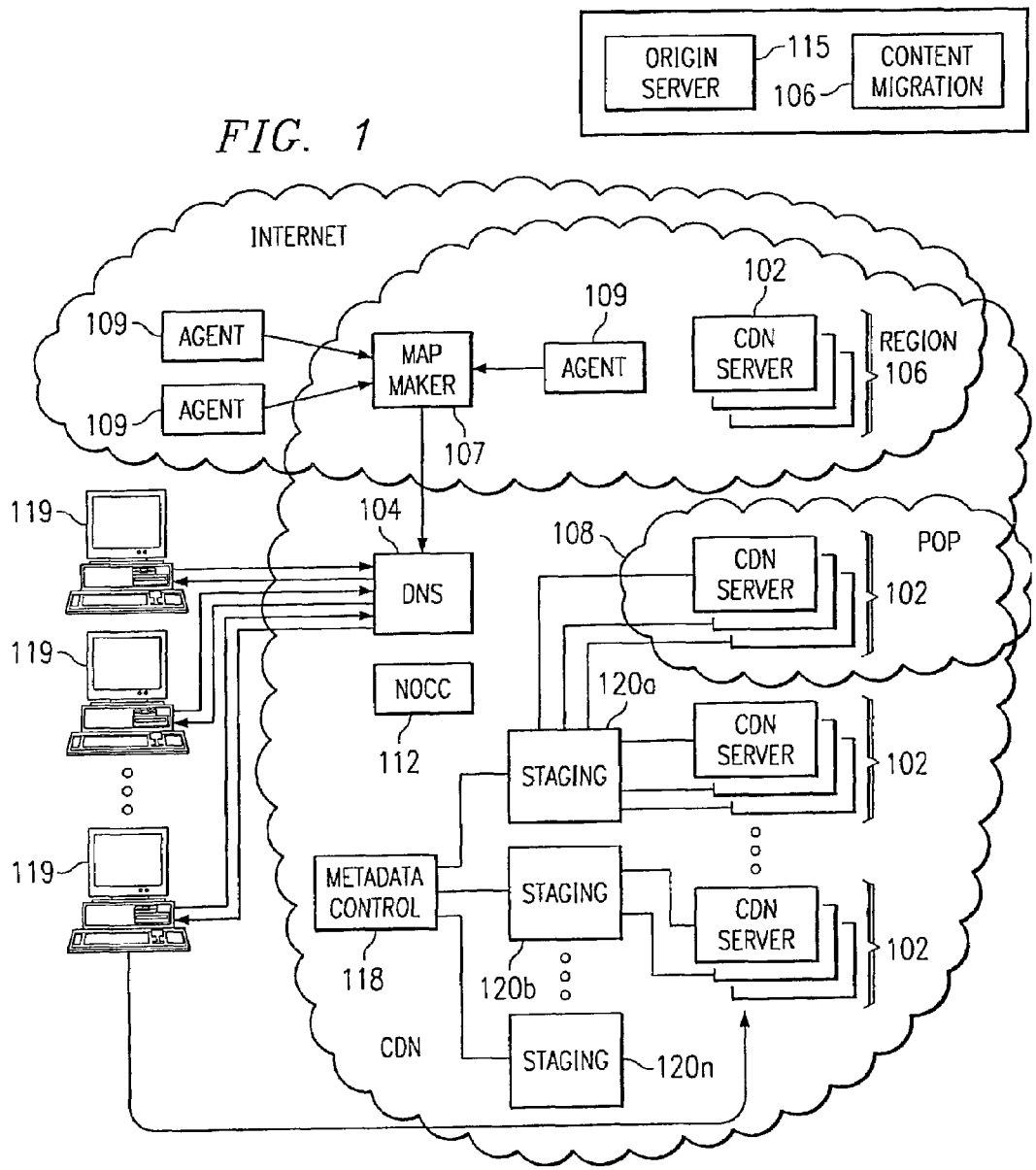
FIG. 1 is a block diagram of a known content delivery network in which the present invention may be implemented.

As seen in FIG. 1, an Internet content delivery infrastructure usually comprises a set of "surrogate" origin servers 102 that are located at strategic locations (e.g., Internet network access points, and the like) for delivering copies of content to requesting end users 119. A surrogate origin server is defined, for example, in IETF Internet Draft titled "Requirements for Surrogates in the HTTP" dated Aug. 9, 2000, which is incorporated herein by reference. The request-routing mechanism 104 allocates servers 102 in the content delivery infrastructure to requesting clients. The distribution infrastructure consists of on-demand or push-based mechanisms that move content from the origin server to the surrogates. A CDN service provider (CDNSP) may organize sets of surrogate origin servers as a group or so-called "region." In this type of arrangement, a CDN region 106 typically comprises a set of one or more content servers that share a common back-end network, e.g., a LAN, and that are located at or near an Internet access point. Thus, for example, a typical CDN region may be co-located within an Internet Service Provider (ISP) Point of Presence (PoP) 108. A representative CDN content server is a Pentium-based caching appliance running an operating system (e.g., Linux, Windows NT, Windows 2000) and having suitable RAM and disk storage for CDN applications and content delivery network content (e.g., HTTP content, streaming media and applications). Such content servers are sometimes referred to as "edge" servers as they are located at or near the so-called outer reach or "edge" of the Internet. The CDN typically also includes network agents 109 that monitor the network as well as the server loads. These network agents are typically co-located at third party data centers or other locations. Mapmaker software 107 receives data generated from the network agents and periodically creates maps that dynamically associate IP addresses (e.g., the IP addresses of client-side local name servers) with the CDN regions.

Content may be identified for delivery from the CDN using a content migrator or rewrite tool 106 operated, for example, at a participating content provider server. Tool 106 rewrites embedded object URLs to point to the CDNSP domain. A request for such content is resolved through a CDNSP-managed DNS to identify a "best" region, and then to identify an edge server within the region that is not overloaded and that is likely to host the requested content. Instead of using content provider-side migration (e.g., using the tool 106), a participating content provider may simply direct the CDNSP to serve an entire domain (or subdomain) by a DNS directive (e.g., a CNAME). In either case, the CDNSP may provide object-specific metadata to the CDN content servers to determine how the CDN content servers will handle a request for an object being served by the CDN. Metadata, as used herein, refers to a set of control options and parameters for the object (e.g., coherence information, origin server identity information, load balancing information, customer code, other control codes, etc.), and such information may be provided to the CDN content servers via a configuration file, in HTTP headers, or in other ways. The Uniform Resource Locator (URL) of an object that is served from the CDN in this manner does not need to be modified by the content provider. When a request for the object is made, for example, by having an end user navigate to a site and select the URL, a customer's DNS system directs the name query (for whatever domain is in the URL) to the CDNSP DNS request routing mechanism. Once an edge server is identified, the browser passes the object request to the server, which applies the metadata supplied from a configuration file or HTTP response headers to determine how the object will be handled.

As also seen in FIG. 1, the CDNSP may operate a metadata transmission system 116 comprising a set of one or more servers to enable metadata to be provided to the CDNSP content servers. The system 116 may comprise at least one control server 118, and one or more staging servers 120a-n, each of which is typically an HTTP server (e.g., Apache). Metadata is provided to the control server 118 by the CDNSP or the content provider (e.g., using a secure extranet application) and periodically delivered to the staging servers 120a-n. The staging servers deliver the metadata to the CDN content servers as necessary.

Figure 2:
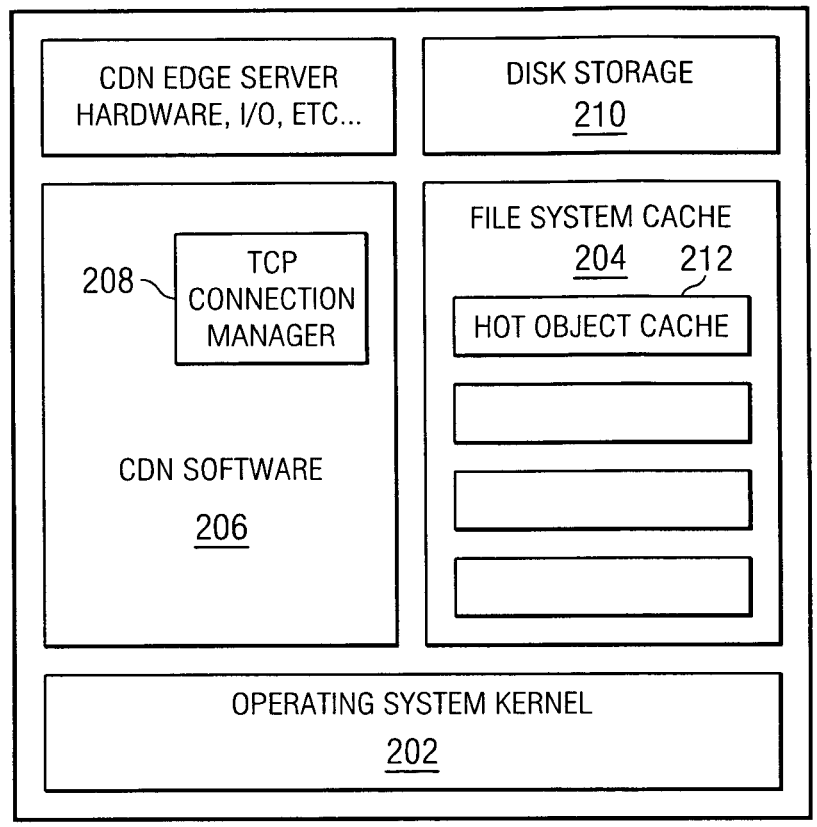
FIG. 2 illustrates a typical machine configuration for a CDN content edge server.

FIG. 2 illustrates a typical machine configuration for a CDN content edge server. Typically, the content server 200 is a caching appliance running an operating system kernel 202, a file system cache 204, CDN software 206, TCP connection manager 208, and disk storage 210. CDN software 206 creates and manages a "hot" object cache 212 for popular objects being served by the CDN. It may also provide other CDN-related functions, such as request routing, in-region load balancing, and the like. In operation as an HTTP cache for example, the content server 200 receives end user requests for content, determines whether the requested object is present in the hot object cache or the disk storage, serves the requested object via HTTP (if it is present) or establishes a connection to another content server or an origin server to attempt to retrieve the requested object upon a cache miss.

Figure 3:
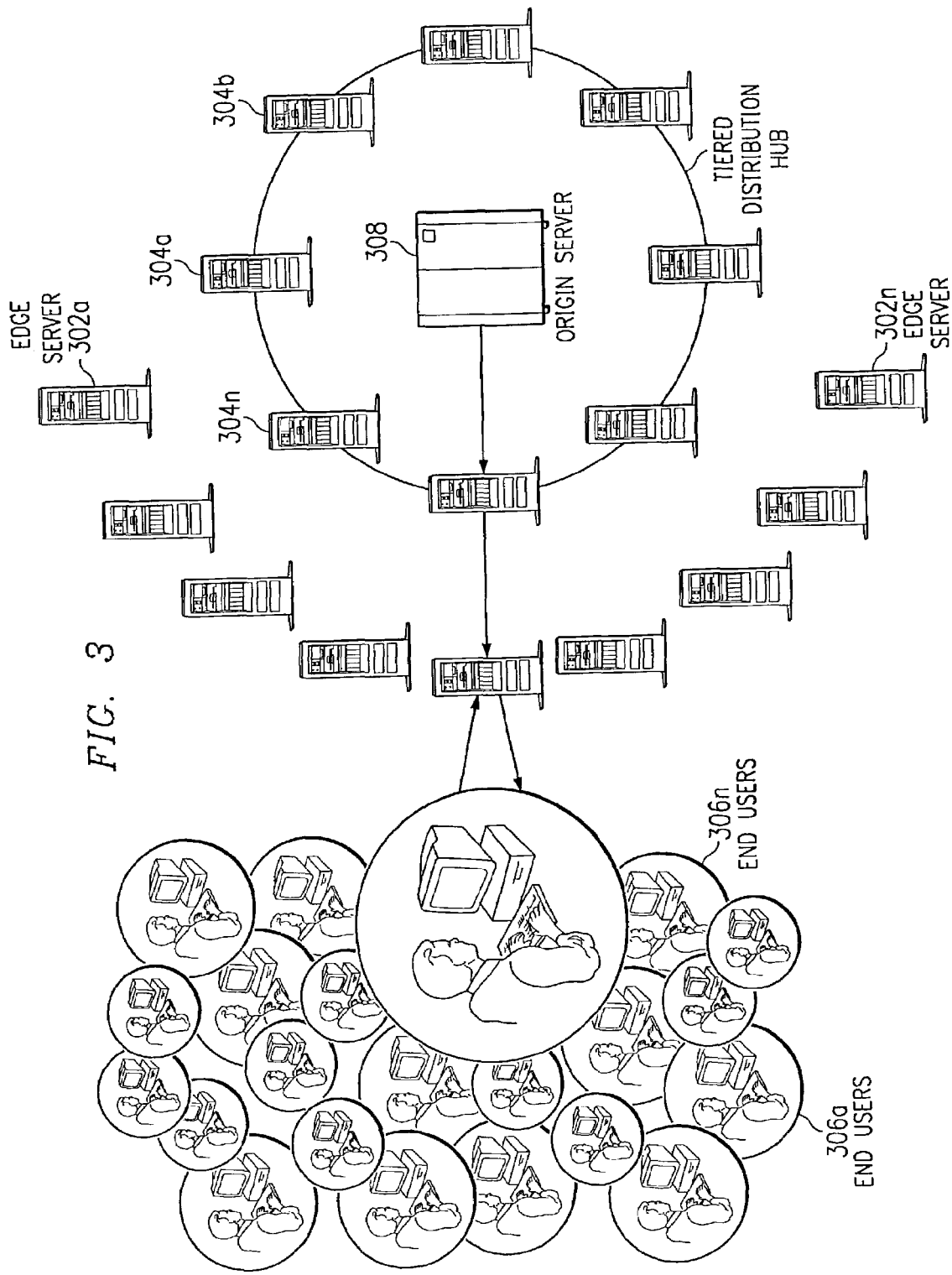
FIG. 3 is a simplified diagram illustrating a CDN tiered distribution scheme.

FIG. 3 illustrates a tiered content distribution technique upon which the shield techniques of the present invention are based. Preferably, the CDN (or other distributed delivery system, as the case may be) employs a tiered infrastructure using two or more tiers: a set of edge servers and a hierarchical set of "parent" or hub regions that service the edge servers. In this example, the CDN service provider operates a plurality of CDN edge servers 302a-n and a set of tiered distribution hubs 304a-n. The tiered distribution hubs accelerate content delivery to end users 306a-n and buffer the origin server 308. The tiered distribution hubs ensure that the edge servers have the information requested by the end users. If the edge servers do not have the appropriate file when it is requested, the servers in the tiered distribution hubs will provide the edge servers with the requested content. Preferably, a tiered distribution hub 304 maintains a persistent connection to the origin server 308, although this is not a requirement. The distribution hubs ensure that end users 306 do not flood the origin site with requests if the site is experiencing high traffic load or if the content is stale, large, or infrequently accessed. In effect, the tiered distribution hubs act as accelerators for the end users, ensuring that the users obtain their desired content quickly and reliably, and the hubs acts as buffers for the origin site's internal infrastructure, guaranteeing that the site is not overwhelmed with requests for popular content or large files.

A representative tiered distribution scheme is described in copending application Ser. No. 10/118,989, titled "Method and System For Tiered Distribution in a Content Delivery Network," filed Apr. 9, 2002, and assigned to the assignee of this application.

With the above as background, the present invention can now be described in detail. As is well known, a Web site and its infrastructure may come under frequent, dangerous attacks. Attacks can come in many different forms, and most attacks are IP packet-based. They often employ known techniques (e.g., slow requests, SYN packet flooding), or exploit known (e.g., Microsoft IIS) vulnerabilities. Generalizing, attacks include, without limitation, attacks on service ports, IP-based operating system attacks, IP-based server attacks, targeted attacks, domain-based resource attacks, private content searches, hijack attacks, byte-range attacks, SYN packet flooding attacks, and others. Indeed, as more and complicated software runs on the origin, there are more opportunities for site vulnerability, and a given attack may be done simply to co-opt the machine to attack others.

The present invention addresses the known vulnerabilities of Web site infrastructure in a novel way—by making an origin server substantially inaccessible via Internet Protocol traffic. In particular, according to the preferred embodiment, the origin server is "shielded" from the publicly-routable IP address space. Preferably, only given machines (acting as clients) can access the origin server, and then only under restricted, secure circumstances. In a preferred embodiment, these clients are the servers located in a "parent" region of a CDN tiered distribution hierarchy. The present invention implements an origin server shield that protects a site against security breaches and the high cost of Web site downtime by ensuring that the only traffic sent to an enterprise's origin infrastructure preferably originates from CDN servers. The inventive "shielding" technique protects a site's Web servers (as well as backend infrastructure, such as application servers, databases, and mail servers) from unauthorized intrusion—improving site uptime and in the process, customer loyalty.

Figure 4C:
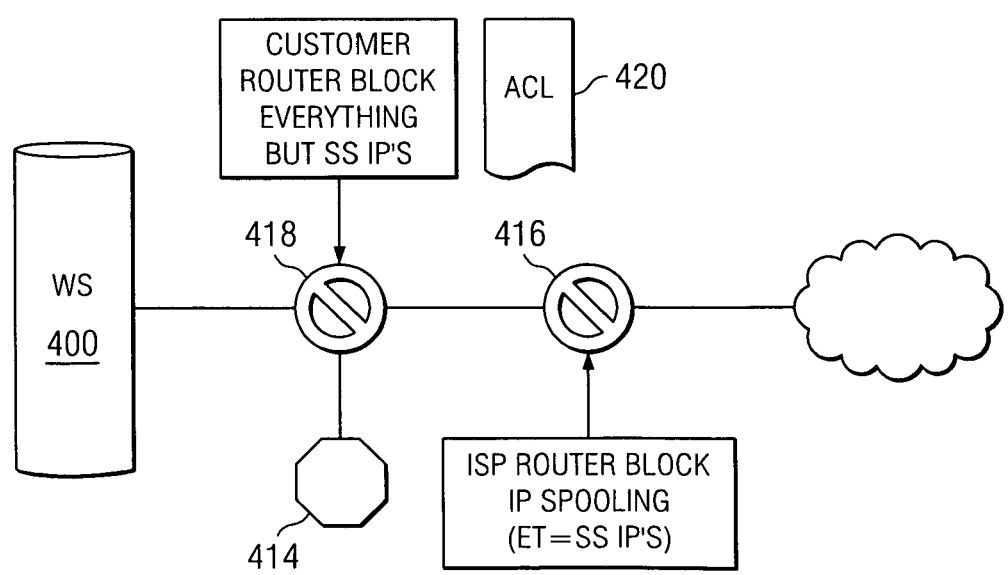
FIG. 4C is a diagram illustrating a preferred provisioning of the shield according to the present invention.
Figure 4A:
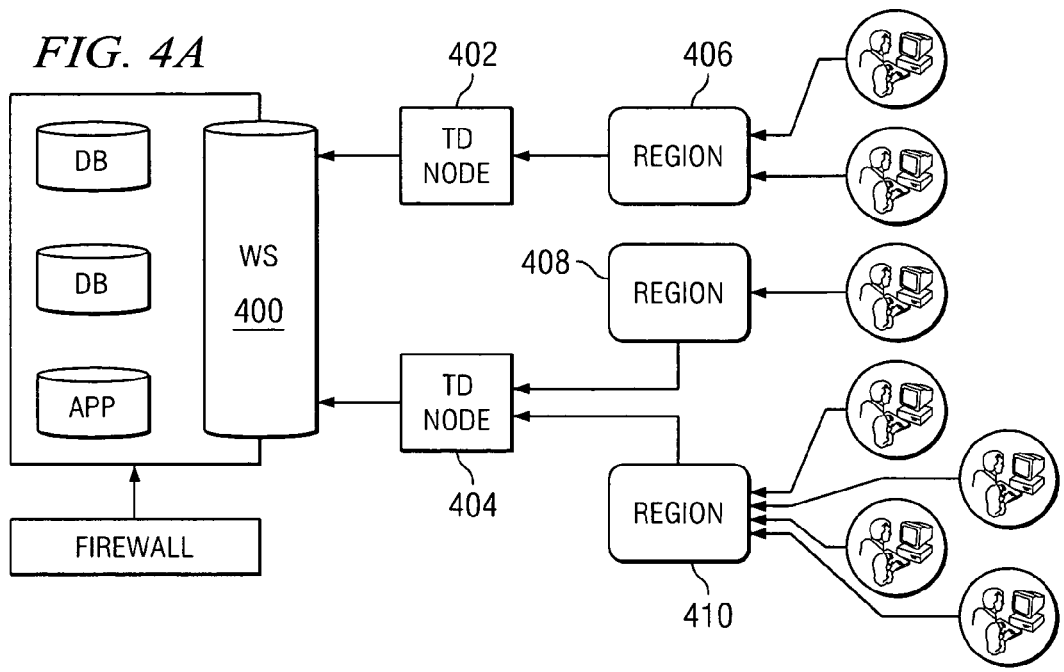
FIG. 4A is a diagram illustrating tiered distribution for a given customer Web site (WS)
Figure 4B:
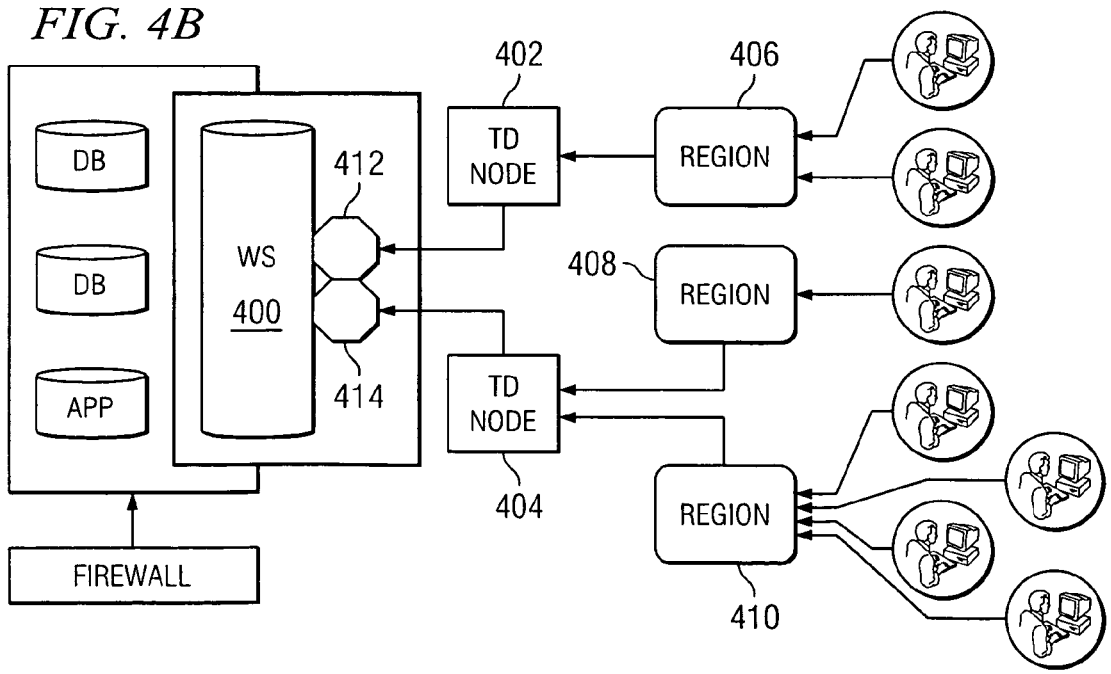
FIG. 4B is a diagram illustrating the use of a shield in conjunction with the tiered distribution scheme of FIG. 4B.

Thus, in general, the invention works to protect Internet infrastructure by effectively hiding it from threats on the public Internet. In a preferred embodiment, a set of dedicated servers of a "parent" CDN region in a tiered distribution scheme form a protective layer between the enterprise origin site infrastructure and the Internet. FIG. 4A illustrates a CDN customer Web site (WS) 400 that has been insulated from flash crowds using a set a tiered distribution nodes 402 and 404 intermediate CDN edge server regions 406, 408 and 410. A tiered distribution (TD) node is sometimes referred to as a "parent" region in the CDN. A given TD node typically includes a set of "parent" servers that, for illustrative purposes only, is located in a hosting data center in a well-connected "core" portion of the Internet web hosting infrastructure. Representative "core" locations include, without limitation, well-connected data centers in the Internet that have high-speed backbones (today these are optical networks running at multiple gigabits per second) and are connected to at least several (e.g., three (3)) other high-speed optical backbone networks. Connection to multiple backbone networks is very desirable to ensure requests can be routed quickly and reliably within the Internet. As seen in FIG. 4B, this known tiered distribution hierarchy is augmented according to the present invention to place a shield (SS) in front of the Web site (WS) so that only traffic originating from the tiered distribution (TD) nodes can access the Web site. Preferably, the shield comprises a pair of machines 412 and 414, for purposes of redundancy. FIG. 4C illustrates a preferred placement of the shield. As illustrated in FIG. 4C, the site infrastructure typically includes an upstream router 416 connectable to the network and a downstream firewall 418. The shield machine 412 preferably runs in front of the firewall 418 but behind the upstream router 416. Preferably, an IP access control list (ACL) 420 is turned on at the firewall 418 to prevent IP addresses (except those identified in the ACL as originating from the TD nodes) from accessing the Web site. In addition, the upstream router is enabled to block IP spoofing for the IP addresses of the shield machines.

In this arrangement, the origin server is masked or hidden from the publicly-routable Internet. The content provider enables its content to be served by the CDN, preferably using the techniques described above with respect to FIG. 1, although this is not meant to be limiting. Preferably, object service metadata, specified by customer, by directory, by object type, or in any other convenient manner, identifies that given content is served by the tiered distribution scheme.

Figure 5:
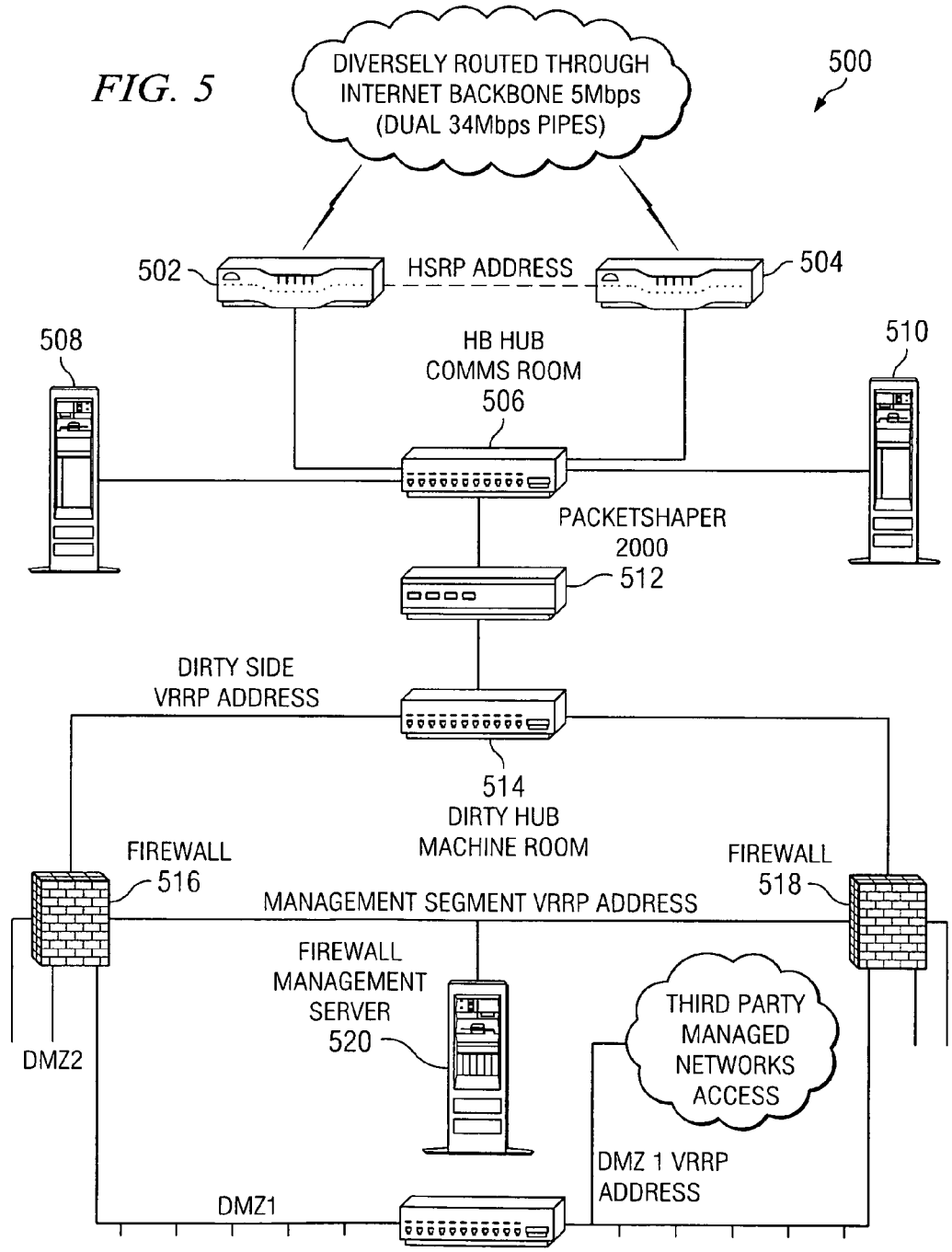
FIG. 5 is a more detailed implementation of the shield at a given CDN customer site.

The particular implementation of the shield will depend, of course, on the actual Web site infrastructure, although typically an installation will require implementation of IP ACLs on the downstream firewall and IP spoofing protection on the upstream router. FIG. 5 illustrates a more detailed implementation for a typical site 500. In this example, the site infrastructure includes a pair of routers 502 and 504 each of which connect to the Internet backbone preferably comprise the upstream router. These routers each connect to a hub 506. As noted above, preferably the shield of the present invention is implemented as a set of redundant machines. In FIG. 5, each of the shield machines 508 and 510 are connected to the hub as illustrated. A packet shaping switch 512 interconnects hub 506 and hub 514. First and second firewall machines 516 and 518 are connected to the hub 514. Firewall machines 516 and 518 together with a firewall management server 520 preferably comprise the downstream firewall. As noted above, preferably IP ACLs are implemented on the downstream firewall. Thus, e.g., assuming that the shield machines are allocated a /27 IP address, the firewall machine ACLs are then set to only accept packets from that /27 address space. This prevents any other IP addresses from communicating with the site's web (or other back-end infrastructure). Given that the location of the /27 IP address space allocated to the shield machines is clearly known and is downstream of the routers, the site is assured that no legitimate packets from these IP addresses will be received on the upstream interface of the routers. As noted above, preferably the upstream routers are then set to implement IP spoofing protection. By implementing IP ACLs on the downstream firewall and ensuring that any such IP spoofed packets are dropped, no outside machine can directly access the site's web server.

Preferably, the setting of IP ACLs (or some other equivalent type of control mechanism) is done on all ports. This generally requires that the site have dedicated servers running the web servers and that there be a separate firewall upstream of these servers. If this is not possible, then IP ACLs should be implemented for web server ports 80 and 443, and it is also desirable in such case to block any unnecessary ports.

Generalizing, a typical site configuration has a server to be protected, a firewall, and an upstream router. According to the invention, at least one shield machine is provisioned between the firewall and the upstream router. In addition, preferably two access controls are implemented. One control is to implement an IP ACL downstream of the shield machine. This ensures that only the IP addresses of the shield machine will be able to access the origin site. The other step is to implement IP spoofing blocking upstream of the shield machine, namely, at the upstream router. This ensures that only the shield machine is able to pass through the downstream ACL.

The invention provides basic surge protection and filtering. A global distributed network such as a CDN provides flash crowd mitigation. As attackers are more and more relying on masking themselves as large flash crowds, this protection extends to mitigation of large-scale DDoS attacks. Through use of customer specific metadata, an origin site can be setup with an unknown name (a name that is not available on the publicly-routable Internet) to protect against attacks. If desired, a CDN server in a shield region can be configured to communicate with the origin server on ports other than standard HTTP or HTTPS ports in a manner invisible to end-users. This provides additional protection from standard "scan" based attacks. Preferably, all nonessential IP services are disabled including FTP, telnet and rlogin. Only remote access permitted is via encrypted and authenticated connections using RSA public key. No physical connections (keyboard, port monitors, and the like) are allowed with CDN servers. Each server continuously monitors its performance and feeds reports of anomalies to a Network Operations Control Center (NOCC).

The present invention provides numerous advantages. The benefits to ensuring that a site's web server is not accessible to the Internet are significant. While firewalls play a key role in protecting systems, they must expose at least one port on one machine to the world. This means that viruses like Code Red, which cycled through IP addresses, or the Code Red attack, which performed an IP based CPU resource attack can still damage or hijack a site's mission-critical systems. With a shield in place, the origin server is protected against these attacks, as well as other similar attacks. Moreover, using a shield ensures that all requests flow through the content delivery network, enabling edge filtering, load protection, and assuring that all traffic back to the origin will be valid HTTP requests.

Representative machines according to the present invention are Intel Pentium-based computers running a Linux or Linux-variant operating system and one or more applications to carry out the described functionality. One or more of the processes described above are implemented as computer programs, namely, as a set of computer instructions, for performing the functionality described.

Variants

In the embodiment described above such as in FIG. 4, the shield is implemented using machines 412 and 414. Such an embodiment may be considered a "local" shield wherein the origin server is not on the Internet (i.e., not reachable via the publicly-routable Internet). An alternative to this approach is to have the managed service provider acquire a new (unpublished) IP address for the site and assign that new IP address to the existing site hardware. The CDN edge servers are then controlled via metadata settings to go the new IP address as needed. As contrasted with the "local" shield approach, the latter technique provides a "remote" shield wherein the origin server is on the Internet but only the managed service provider knows its IP address. The origin server's firewall is provided with a list of remote shield regions within the CDN from which all authorized requests will originate.

Yet another approach is to place the origin server in a distinct (i.e., different) autonomous system (AS) so that, in effect, it has its own network. That network is then advertised (through any convenient routing protocol, such as Enhanced Interior Gateway Routing Protocol (EIGRP), OSPF (Open Shortest Path First (OSPF), or the like) to the network that contains the shield region. Preferably, this origin server network is not advertised to the public Internet and, thus, is not reachable via the Internet. The shield region, however, can see this address space, but a third party—such as an attacker—cannot. The shield region preferably is in public-routable IP address space.

The invention claimed is:

1. A method of protecting a Web site from attack, wherein a given content provider makes the Web site available at an origin server at an IP address, comprising:

establishing and maintaining a content delivery network (CDN) having a set of content servers organized into regions provide content delivery on behalf of participating content providers;

offloading given content from the Web site to the CDN so that the given content can be delivered from the CDN instead of from the origin server, wherein the offloading step is accomplished by aliasing a given content provider domain to a domain managed by the CDN;

providing at least some of the set of CDN content servers with the IP address of the origin server so that a given CDN content server can locate the origin server in the event that the given content cannot be served from the CDN and the given CDN content server has to return to the origin server to try to obtain the given content;

using the CDN to shield the origin server from given Internet Protocol (IP) traffic routable over the public Internet;

wherein the using step restricts access to the origin server except by CDN content servers that have obtained the IP address of the origin server as a result of the providing step;

wherein the IP address is located in a private IP address space and the using step further includes restricting IP spoofing for addresses within the private IP address space using an access control; and serving content to a requesting end user from one of the set of content servers.

2. The method as described in claim 1 wherein the access control is implemented at a firewall.

3. The method as described in claim 1 wherein the set of content servers includes at least one CDN distribution node intermediate the origin server and a subset of content servers located at an Internet Point Of Presence (PoP).

4. The method as described in claim 1 wherein the access is restricted by an access control implemented in association with a router.

5. The method as described in claim 1 wherein the origin server is located in a network that advertises its reachability only to the servers in the content delivery network.

6. The method as described in claim 1 wherein the servers in the content delivery network comprise a given tier of a CDN cache hierarchy.

* * * * *